United States Patent [19]
Potnis et al.

[11] Patent Number: 6,153,701
[45] Date of Patent: Nov. 28, 2000

[54] WETTABLE POLYPROPYLENE COMPOSITION AND RELATED METHOD OF MANUFACTURE

[75] Inventors: Prasad S. Potnis, Washingtonville, N.Y.; Ashok M. Adur, Ramsey, N.J.; Wayne Chu, Tarrytown, N.Y.

[73] Assignee: International Paper Company, Purchase, N.Y.

[21] Appl. No.: 09/196,544

[22] Filed: Nov. 20, 1998

[51] Int. Cl.[7] .............................. C08L 9/00; C08L 33/02; C08L 33/04; C08L 23/00
[52] U.S. Cl. ..................... 525/191; 525/221; 525/222; 525/231; 525/232; 525/240
[58] Field of Search ................... 525/191, 221, 525/222, 231, 232, 240

[56] References Cited

U.S. PATENT DOCUMENTS

| | | | |
|---|---|---|---|
| 3,966,672 | 6/1976 | Gaylord . | |
| 4,708,918 | 11/1987 | Fitzgerald et al. | 429/210 |
| 4,764,546 | 8/1988 | Mitsuno et al. | 523/213 |
| 4,957,968 | 9/1990 | Adur et al. | 525/74 |
| 5,230,963 | 7/1993 | Knoerzer | 428/520 |
| 5,244,951 | 9/1993 | Gardiner | 524/168 |
| 5,328,951 | 7/1994 | Gardiner | 524/287 |
| 5,331,046 | 7/1994 | Chang et al. | 525/71 |
| 5,464,687 | 11/1995 | Sheth | 428/286 |
| 5,486,561 | 1/1996 | Hirano et al. | 524/451 |
| 5,677,377 | 10/1997 | Hasegawa et al. | 525/74 |
| 5,677,378 | 10/1997 | Hasegawa et al. | 525/74 |

FOREIGN PATENT DOCUMENTS

| | | |
|---|---|---|
| 210754 A1 | 2/1987 | European Pat. Off. . |
| 04011060 | 1/1992 | Japan . |

*Primary Examiner*—Nathan M. Nutter
*Attorney, Agent, or Firm*—Dara L. Onofrid, Esq.

[57] ABSTRACT

A wettable polypropylene composition comprising polypropylene and a hydrophilic, polar compound which includes functional sites selected from the group consisting of carboxyl, hydroxy, ether or ester moieties, wherein the polypropylene composition is wettable, having a contact angle less than or equal to 75°. The hydrophilic polar compounds are selected from the group consisting of maleic anhydride-modified polypropylene (MAPP), acrylic acid modified polypropylene, ethylene acrylate modified polypropylene, polypropylene grafted with a sodium salt of an acrylic acid, polyethylene glycol (PEG), modified polyethylene glycol, polyvinyl alcohol (PVOH), polyvinyl formal (PVF); and monomer and dimer fatty acids having a carbon chain length in the range of 6 to 50, preferably 18 to 36. The compositions can further include the presence of an amorphous compound and surfactants.

41 Claims, 1 Drawing Sheet

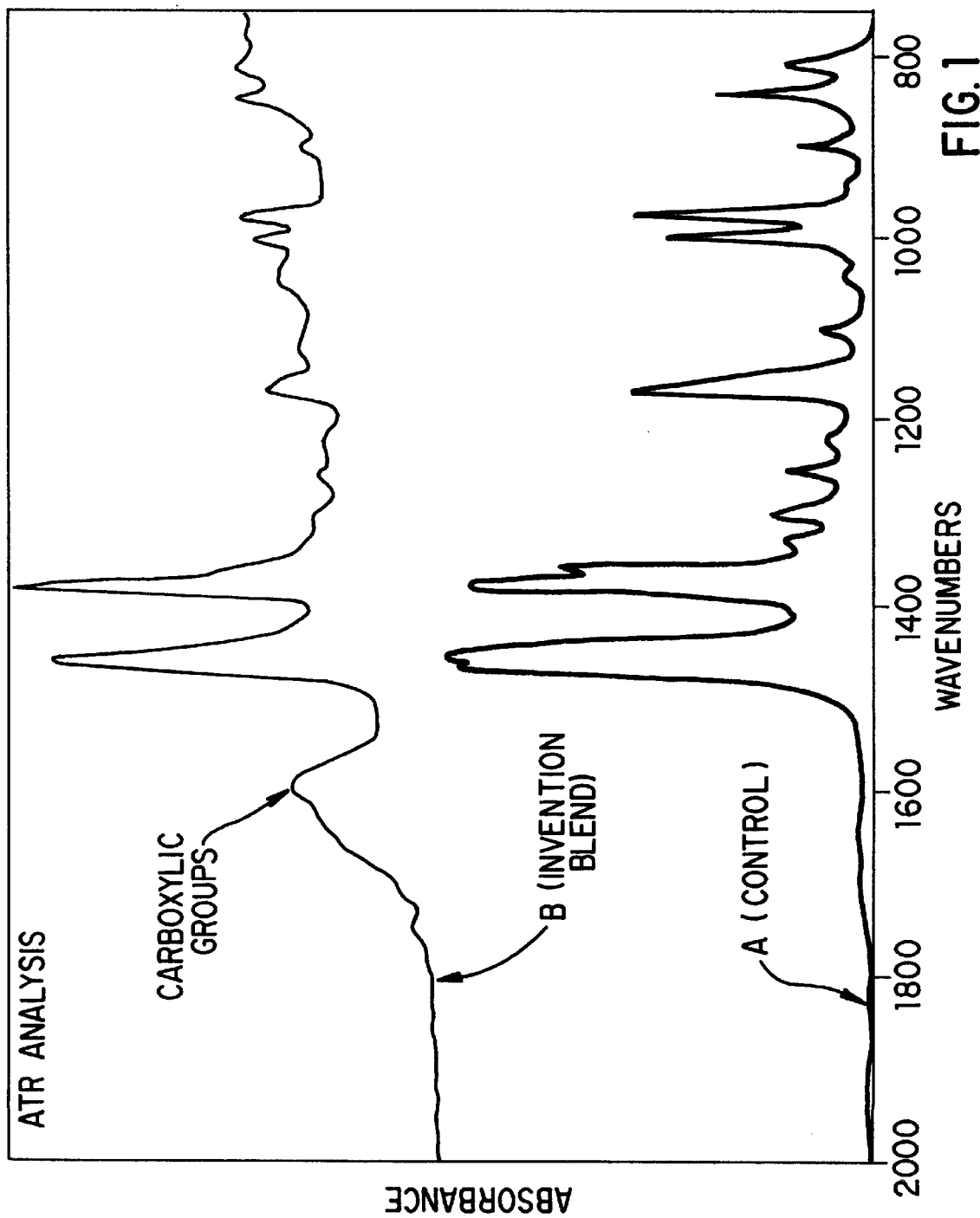

WETTABLE POLYPROPYLENE COMPOSITION AND RELATED METHOD OF MANUFACTURE

FIELD OF THE INVENTION

The present invention relates to a wettable polypropylene composition. More particularly, the invention is directed to a method of making polypropylene wettable by treating unmodified polypropylene with a hydrophilic polar compound which includes functional sites selected from the group consisting of carboxyl, hydroxy, ether or ester moieties.

BACKGROUND OF THE INVENTION

Polypropylene fiber is hydrophobic but can be converted into a hydrophilic one by modifying its surface with polar groups. It is known in the art to achieve this result by chemically modifying the surface. However, topical chemical applications are not entirely satisfactory as they are not durable, and other types of surface modifications may need extra processing steps and tend to be expensive. In addition, some of these modifications age with time, especially in the presence of 31% potassium hydroxide (KOH) electrolyte solution used in alkaline batteries. An alternative and improvement over chemical modification is to directly melt blend an additive with polar groups that would migrate to the surface to render the polypropylene hydrophilic.

The invention provides such a process for producing a composition comprising polypropylene mixed with a hydrophilic polar compound including functional sites selected from the group consisting of carboxyl, hydroxy, ether or ester moieties. The process involves melting polypropylene granules with the hydrophilic compound, preferably maleic anhydride modified polypropylene (MA-PP). Fatty acid dimers and monomers, as well as polyvinyl alcohol and polyethylene glycols can be incorporated into the compositions. Surfactants and amorphous compounds such as EPDM, amorphous polypropylene, polybutylene blends and other low crystallinity polymers may also be added.

In general, use of maleic anhydride to modify polyolefins is known in the art, in particular, it is used to form copolymers with other olefins to produce polymers that absorb water. In most applications the maleic anhydride-polypropylene is used as a compatibilizer in blends of polypropylene with nylon, and polypolypropylene with fillers to improve the properties of the product. In both these situations the maleic anhydride-polypropylene remains inside the bulk of the blends and not at the surface.

U.S. Pat. Nos. 5,677,377 and 5,677,378 to Hasegawa et al., U.S. Pat. No. 5,230,963 to Knoerzer, U.S. Pat. No. 4,764,546 to Mitsuno et al., U.S. Pat. No. 4,708,918 to Fitzgerald et al. and U.S. Pat. No. 3,966,72 to Gaylord are representative of disclosures which include maleic anhydride modified polypropylene.

In particular, U.S. Pat. No. 4,957,968 to Adur et al. discloses use of maleic anhydride-polypropylene, ethylene propylene diene rubber and polypropylene in adhesive applications to the surfaces such as paper and aluminum. The melt flow rate of the Adur compositions are low, are partially cured and are not used for fiber and nonwoven applications.

The criteria used to achieve durable wettability are based on three factors: (1) materials that have hydrophilic groups and have a limited solubility in water, unlike the water-soluble surfactants that result in temporary wettability; (2) materials that have a viscosity lower than the matrix resin so that they can move to the surface as exhibited in the blends based on the lower melt flow rates; and (3) an amorphous co-additive which is blended to reduce the crystallinity and crystallization rate of the polypropylene to allow the wettability additives to migrate to the surface layers.

The wettable polypropylene compositions of the invention meet all these criteria by providing a mixture of unmodified polypropylene with a hydrophilic polar compound which includes functional sites selected from the group consisting of carboxyl, hydroxy, ether or ester moieties. The polypropylene composition produced is wettable, having a contact angle of less than or equal to 75° which is an improvement over unmodified polypropylene films exhibit a contact angle of 100 to 105°.

There are several applications for the wettable or hydrophilic polypropylene of the invention, in particular in combination with a paper-based product. These include printable polypropylene for packaging, hygiene products and automotive and industrial application. Other applications include the battery market. The rechargeable battery separator market is in the process of transitioning from nylon 66/nylon 6, the material from which the separators are presently made from, to polypropylene because the nylon-based product undergoes degradation by the electrolyte. Such degradation decreases the overall cell lifetime. Polypropylene resists such degradation, however it needs to be permanently hydrophilic to be suitable for this application. Hence there is a need to develop a permanently wettable polypropylene by directly incorporating additives or polymeric components during melt processing. The modified polypropylene can be used to make wettable spunbonded and/or melt blown nonwovens.

An object of the invention is to develop wettability of polypropylene by using an additive with polar groups that wet with water and KOH solution without dissolving in it to prevent leach out.

A further object of the invention is to provide a wettable polypropylene that exhibits a contact angle of at least 70 to 75° (similar to nylon), preferably lower, and resists the effect of 31% KOH used as an electrolyte in rechargeable batteries.

Another further object of the invention is to provide a wettable polypropylene which is formed into a nonwoven having a wicking of 3 cm or greater.

A specific object of the invention is to provide a blend of polypropylene containing the additives that can be converted into a fibrous material by melt blowing it or spinning fibers.

A more specific object of the invention is to provide a wettable polypropylene that can be used in battery separators, absorbent and hygiene products.

Another object of the invention is to achieve a wettable polypropylene extrusion coating on paper or paperboard for use in packaging applications where stiffness and printability is important.

Another object of the invention is to achieve a polypropylene which acts as a polar tie layer in laminates and thereby eliminating the expensive tie layer of specialty resins.

SUMMARY OF THE INVENTION

In the present invention, these purposes, as well as others which will be apparent, are achieved generally by providing a wettable polypropylene composition comprising unmodified polypropylene and a hydrophilic, polar compound which includes functional sites selected from the group consisting of carboxyl, hydroxy, ether or ester moieties. The presence of the hydrophilic polar compound modifies the polypropylene which is made wettable. Unmodified polypropylene films exhibit contact angle of 100–105° whereas the polypropylene films made from the invention have a contact angle less than or equal to 75°.

The modified polypropylene composition of the invention further has a melt flow rate greater than 12 dg/min and remains wettable under conditions such as in a 31% KOH solution at 70° C. for at least 7 days.

The wettable polypropylene composition comprises up to 85 weight % of polypropylene and up to 35 weight % of the hydrophilic, polar compound. The hydrophilic, polar compounds have a lower viscosity than the polypropylene.

The polar compounds used in the invention are selected from the group consisting of maleic anhydride-modified polypropylene (MAPP), acrylic acid modified polypropylene, ethylene acrylate modified polypropylene, polypropylene grafted with a sodium salt of an acrylic acid, polyethylene glycol (PEG), modified polyethylene glycol, polyvinyl alcohol (PVOH) and polyvinyl formal (PVF). These materials migrate to the surface of the polypropylene and solidify thereon.

The hydrophilic polar compounds may also be selected from the group consisting of monomer and dimer fatty acids having a carbon chain length in the range of 6 to 50, preferably 18 to 36. Examples of such materials include Acintol® Tall Oil Fatty Acids, Acintol® Distilled Tall Oils (monomer acids) and Sylvadym® Dimer Acids and are all commercially available from Arizona Chemical Company, Panama City, Fla. These polar compounds are liquid materials which migrate to the surface of the polypropylene an remain as liquid on the surface thereof.

Additional composition components to the compositions include a surfactants and an amorphous compound which enhance the migration of said hydrophilic compound to the surface of the polypropylene. The amorphous compounds are selected from the group consisting of ethylene propylene diene monomer ("EPDM"), amorphous PP, polybutylene blends, and other low crystallinity polymers.

The wettable polypropylene composition has many applications including use in battery separators, absorbent and hygiene products, films and extrusion coated paper and paperboard.

Other objects, features and advantages of the present invention will become apparent from the following detailed description of the best mode of practicing the invention when considered with reference to the drawings as follows:

BRIEF DESCRIPTION OF THE DRAWINGS

FIG. 1 is a graphic illustration of the ATR analysis of a control film of unmodified polypropylene, lower graph A, and a film made from an invention blend comprising MA-PP, EPDM and PP, upper graph B.

DETAILED DESCRIPTION OF THE INVENTION

In general, a wettable polypropylene composition and related method is provided wherein the composition comprises unmodified polypropylene and a hydrophilic compound which includes functional sites selected from the group consisting of carboxyl, hydroxy, ether or ester moieties. Unmodified polypropylene films are not wettable and exhibit a contact angle of 100 to 105°, in contrast the modified polypropylene of the invention is wettable and has a contact angle of less than or equal to 75°.

The wettable polypropylene composition has many applications including use in battery separators, absorbent and hygiene products, films and extrusion coated paper and paperboard. Specifically, it is known that current nylon based battery separators degrade in the presence of the potassium hydroxide electrolyte. The invention presents a replacement for the nylon based battery separators by providing an inert polypropylene separator that has been made permanently wettable. Polypropylene is naturally hydrophobic. Known methods to make polypropylene wettable involves surface grafting of acrylic acid by ultraviolet radiation or by other surface modification methods which are slow and expensive. The invention process provides advantage over known prior art methods by modifying the chemical nature of the polypropylene by using hydrophilic polar compounds that migrate to the surface. The polypropylene composition of the invention has the appropriate melt flow rate (rheology), the proper ratio of the components and results in permanent surface wettability. The various embodiments of the wettable polypropylene composition and methods to produce them for use in battery separators and other applications are discussed in detail herein.

In a first embodiment the composition generally is comprised of a mixture of unmodified polypropylene and maleic anhydride modified polypropylene (MA-PP). This mixture is treated with hot potassium hydroxide (KOH) to provide permanent wettability. Without hot KOH treatment the mixture of polypropylene and MA-PP is not wettable.

This embodiment, which is preferably used in battery separator applications, includes polypropylene blends that typically contain 10 to 35% maleic anhydride modified polypropylene (MA-PP) with a high melt flow rate in the range of 120 to 1200. Additional components include 5 to 25% of ethylene propylene diene ("EPDM") rubber based amorphous component with a melt index in the range of 1.0 to 6.0; as well as a surfactant, such as AX5 commercially available from Polyvel, New Jersey, The surfactant provides additional hydrophilic groups. The uniform mixing of the components is important to achieve effective wettability by the migration of the high melt flow rate maleic anhydride modified polypropylene to the surface. The amorphous compounds, if present, affects crystallization such that they help the surfactant migrate to the surface to improve wettability.

FIG. 1 illustrates the surface migration of the hydrophilic compounds of the invention compositions. The lower graph A represents the control of an unmodified polypropylene film sample, the upper graph B represents a film made from an invention blend comprising MA-PP, EPDM and PP. The peak at 1600 represents carboxylic groups and shows wettability of the invention polypropylene compositions.

Attenuated Total Reflectance ("ATR") analysis using a Gelinium crystal confirmed the presence of the maleic anhydride modified polypropylene with its polar groups at 0.4 microns into the surface. The ATR analysis also concluded that the maleic anhydride modified polypropylene groups were concentrated in the surface as opposed to being concentrated inside the films tested. The polar groups of the maleic anhydride ring were activated by treatment with a hot (80° C.) 31% KOH solution which is also the electrolyte used in rechargeable batteries.

For fibrous battery separator applications the polypropylene needs to be resistant to the KOH and exhibit permanent wettability throughout the life of the product. Wettability is quantified by contact angle measurements in the case of a film and additionally by the rate of wicking in the case of a fibrous web used as the battery separator. The contact angle values achieved using the formulations in this invention after being activated by the hot KOH treatment range from 70–78°. These values are in the range of nylon which is the current material used in this application. The values obtained are considerably lower from the normal contact range of 100–105° for unmodified polypropylene.

The blends can be converted into fibrous webs by the melt blown process and can be treated with hot KOH or the blends can be converted into fibers that can be wet laid into webs and then treated with hot KOH to achieve permanent wettability. The components of the blends and the effective melt flow rate of the blend are adjusted so that it can be easily spun into fibers. The fibers due to their inherent fine diameter and larger surface area assist in the faster and efficient migration of the maleic anhydride modified polypropylene to the surface to achieve wettability. Due to the durability of this embodiment, preferred applications include use in battery separators.

Another route to achieve durable wettability is by adding 5–15% of melt processable polyvinyl alcohol (PVOH) that is 10 to 30 MI or by adding 5–15% of modified polyethylene glycols (PEG) 2500–30000 molecular weight to the blend of polypropylene and maleic anhydride modified polypropylene. In each case these are added together with the MA-PP so that they form an adduct by reacting the free hydroxyl groups of the PVOH and the PEGs with the carboxyl groups of the maleic anhydride modified polypropylene. This helps anchor these polar components of the blend and result in durable wettability. In this instance the activation by KOH is not necessary to provide wettability.

Alternatively, the polyvinyl alcohols and the modified polyethylene glycols can be used as the hydrophilic polar compounds and are combined with the unmodified polypropylene without the inclusion of the maleic anhydride modified polypropylene. The durablility of this embodiment is sufficient for hygiene and packaging applications.

In a second embodiment, the polypropylene blends include mixture of unmodified polypropylene and a hydrophilic, polar compound selected from the group consisting of monomer and dimer fatty acids having a carbon chain length in the range of 6 to 50, preferably 18 to 36. In a preferred composition of this embodiment the blend contains 2 to 15% of Acintol® Tall Oil Fatty Acids, Acintol® Distilled Tall Oils (monomer acids) and Sylvadym® Dimer Acids which are all commercially available from Arizona Chemical Company, Panama City, Fla. and are fully described in the Technical Data Sheets which are incorporated herein by reference. These polar compounds are liquid materials which migrate to the surface of the polypropylene and remain as liquid on the surface thereon.

Up to 25% of ethylene propylene diene ("EPSM") rubber based amorphous component with a melt index in the range of 1.0 to 6.0 may also included. The unmodified polypropylene has a melt flow rate ranging from 12 to 1000.

As in the first embodiment, uniform mixing of the components is critical to achieve effective wettability by the migration. Wettability is quantified by contact angle measurements in the case of a film and additionally by the rate of wicking in the case of a fibrous web used as a battery separator. The contact angle values achieved using the formulations in films that are thermally treated at 100° C. for 1 hour, are as low as 50–70 degrees and wettability of the films improves with time. These values are better than those of nylon which is the current material used in this application. The values obtained are considerably lower from the normal contact range of 100–105° for polypropylene.

The blends can be converted into fibrous webs by the melt blown process or the blends can be converted into fibers that can be wet laid into webs. The components of the blends and the effective melt flow rate of the blend are adjusted so that it can be easily spun into fibers. In the case of melt blown webs there is no initial wetting or wicking. However, after aging in 31% KOH for 7 days at 70° C. the blends comprising polypropylene, dimer acid (Sylvadym® T-17) and EPDM exhibited wicking of 7.3 cm (target max 8.0 cm), no loss in weight, wet out in 4.7 secs (target<60 secs), and absorbency of at least 200 gms/10 mins as required by criteria for battery separator applications.

In other alternate embodiments the dimer acid, i.e. Sylvadym® T-17, can be replaced by a monomer (Acintol®), which is added to the blend along with the EPDM and a peroxide catalyst to react the monomer onto the double bond of the EPDM and hence result in durable wettability. A blend with Acintol® converted into melt blown webs exhibited delayed wetting after aging in KOH. The results after aging were wet out in 0 secs, absorbency greater than 200 gms/10 mins, wicking of 3.0 cms target (3–8 cms), but there was a higher weight loss than in the case of the dimer (Sylvadym® T-17). The above blend can be modified to achieve improved initial wetting by adding 0.5 to 10% of a surfactant such as VW350 or VW350 commercially available from Polyvel, Inc, New Jersey.

Modifications of the second embodiment include in addition to the components described above the further presence of maleic anhydride modified polypropylene, preferably up to 5%.

In other alternate embodiments of the invention the maleic anhydride modified polypropylene can be replaced by acrylic acid modified polypropylene or ethylene acrylate modified polypropylene. In some instances a polypropylene grafted with a sodium salt of an acrylic acid could be used to achieve improved wettability and even some degree of absorbency.

The ethylene propylene diene rubber can be replaced by other amorphous materials such as amorphous polypropylene, polybutylene blends and other low crystallinity polymers.

The surfactant concentrates can be blended in resins with high melt flow rates ranging from 35 to 800 to aid in the migration of the hydrophilic additives to the surface. Such a higher melt flow rate resin would improve processability. A processing aid can also be added to improve the conversion of the blend into fibrous webs.

The components of the blends can be adjusted to suit the application. For example in hygiene applications the blend includes polar additives such as PVOH, PEG or fatty acid dimers or monomers and the surfactant, no MA-PP is incorporated since its presence is known to be a skin irritant. In battery separator, or packaging tie layer applications the blend can further include MA-PP, an amorphous component and other polar components (PVOH or PEG adducts and fatty acid dimers or monomers). The various versions of the blends can be used in applications from health and hygiene to the battery separators, packaging, graphics and other industrial products. The properties of the polypropylene and other resin used in the blends and the rheology (MFR, MI) can be adjusted to make fibers, nonwovens, films, extrusion coatings, moldings and profiles. In place of the KOH solution another alkali solution or another chemical that opens the maleic anhydride ring and attaches a metal or polar ion at the end that results in a polar end that is wettable can be used.

In most cases chemicals such as maleic anhydride modified polypropylene are used as polar tie layers and are effective when used in contact with a polar substrate. This also requires coating of the tie layer in a molten state. However, in the present invention analysis has shown that the ratios of components of the appropriate melt flow rate results in the migration of the polar groups from the anhydride to the surface exposed to a nonpolar air interface. These anhydride groups at the surface are in the form of a closed ring and do not exhibit sufficient wettability until they are activated by a hot KOH solution where by the potassium ion joins the opened anhydride ring and results in wettability. The contact angle of polypropylene is in the range of 70 to 78°. As the activation liquid is KOH, wettability achieved in such a manner would be resistant to the KOH used as an electrolyte in the battery. Further, the additional surfactant used in the blend improves the wettability and response time during the filling of the pores of the battery separator by the electrolyte.

In some cases wettability is claimed by use of the surfactant by itself. Although such wettability is good for applications in the hygiene products area, the surfactants leach out of the blends into the water of KOH solutions and hence do not have the permanency of wettability required by the battery separator application. Thus the wettability achieved by this invention is a definite advantage over the existing prior art in this area. The surface grafting of polar groups on the polypropylene surface by ultraviolet radiation is known, however this process has the maximum effect on the surface leaving the inside layers of the fibrous material unavailable for surface modification. The invention provides a permanently wettable polypropylene throughout the fibrous materials which also resists change in wettability as a result of surface abrasion. The use of a melt incorporated additive eliminates the need for expensive ultra-violet radiation equipment.

The wettable polypropylene of the invention is based on melt incorporated additives that migrate to the surface due to the effect of the viscosity differential and the semicompatible amorphous and crystalline phases. The additives used have polar groups and include low viscosity polymers such as maleic anhydride grafted onto polypropylene (MA-PP) or ethylene ethyl acrylate (MA-EEA). Other hydrophilic polar compounds used in the invention include polypropylene grafted with a sodium salt of an acrylic acid, polyethylene glycol (PEG), modified polyethylene glycol, polyvinyl alcohol (PVOH), polyvinyl formal (PVF), and monomer and dimer fatty acids having a carbon chain length in the range of 18 to 36. The polymers that produce the semicompatible amorphous and crystalline phases are elastomeric amorphous polymers such as ethylene propylene diene (EPDM) rubber. Surfactants, such as AX5, VW350 and VW351 commercially available from Polyvel, Inc. New Jersey, can be added to the blends to provide initial wetting. Although these surfactants dissolve in water and result in wettability that is less durable in potassium hydroxide they can cover the surface with a polar layer at the air interface which would effectively increase the migration of the polymeric polar additives (i.e. PEGS, PVOH, MA-PP etc.) to increase the durability of the wettable polypropylene.

In a preferred embodiment of the invention the wettable polypropylene composition comprises (i) maleic anhydride (MA) modified polypropylene or maleic anhydride modified ethylene ethyl acrylate, (ii) ethylene propylene diene rubber (EPDM), (iii) polypropylene, preferably isotatic polypropylene, having a melt flow rate 12 to 1000 and (iv) optionally, surfactants can be added to the composition to increase wettability such that the melt flow rate of the configuration is suitable for fibers and nonwoven applications.

In another preferred embodiment, the hydrophilic polar compound is a mixture of two materials, the first material selected from the group consisting of maleic anhydride-modified polypropylene (MAPP), acrylic acid modified polypropylene, ethylene acrylate modified polypropylene, polypropylene grafted with a sodium salt of an acrylic acid, polyethylene glycol (PEG), modified polyethylene glycol, polyvinyl alcohol (PVOH), polyvinyl formal (PVF); and the second material selected from the group consisting of monomer and dimer fatty acids having a carbon chain length in the range of 6 to 50, preferably 18 to 36.

Treatment of hot water or potassium hydroxide helps to migrate the polar compounds in the surface layer toward the air interface to result in the required durable wettability. Surfactants can be used to help in the migration process, the use of such materials by themselves to provide wettability of lesser durability is known in the art. The blends of the present invention are used to make fibers and melt blown webs for use in battery separators, as well as to make films, and for extrusion coating applications.

Also included in the invention is a method of making polypropylene wettable which comprises the steps of mixing the unmodified polypropylene and a hydrophilic, polar compound which includes functional sites selected from the group consisting of carboxyl, hydroxy, ether or ester moieties to form a mixture. The mixture is heated to temperatures in the range of 200 to 220° C. to melt the polypropylene and then cooled so the polypropylene solidifies and the hydrophilic polar compound migrates to the surface of the polypropylene such that the polypropylene formed is hydrophilic. Uniform mixing of the components is important to achieve effective wettable.

Preferably, the mixture comprises up to 85 weight % the polypropylene and up to 35 weight % of the hydrophilic polar compound. The hydrophilic, polar compounds have a lower viscosity than said polypropylene. Depending on the polar compound used they migrate to the surface of the polypropylene and either solidify on said surface, such as MA-PP, PVOH, PEG, or remain as a liquid, such as the dimer acid. Surfactants and amorphous compounds, if included in the blends, are uniformly mixed in with the polypropylene and the polar compounds.

The polypropylene produced by the process is formed into a fiber, film, coating or nonwoven by conventional methods. In addition, the polypropylene can be formed into a nonwoven having a wicking of 3 cm or greater.

To understand the present invention more fully, the following examples of the processes of this invention are described below. These examples are for purposes of illustration only and this invention should not be considered to be limited by any recitation used therein. The examples demonstrate the method of the invention in modifying polypropylene by using different hydrophilic polar compounds to produce a wettable polypropylene composition.

As in the examples below, unless otherwise specified, the test procedures for testing electrolyte initial wet out time, retention time (absorbency) and wicking in battery separator fabric are as follows:

Preparation of 31% KOH Solution:

Ingredients: Distilled water and potassium hydroxide pellets (KOH). Procedure: The distilled water is freed of dissolved carbon dioxide by boiling and covering with a watch glass. The boiled water is allowed to cool to room temperature. The solution should be 31% KOH by weight. Since solid KOH contains approximately 10% water, 34.5 g of solid KOH is used for every 100 g of solution required.

The solution is made by slowly adding the 34.5 g of KOH to 65.5 g of water.

Sample Web Preparations.

For each sample four ⅝" round circles and four 4"×4" squares were cut.

Initial Wet Out Time.

10 ml of 31% KOH was placed in a five inch watch glass. One ⅝" diameter disc sample was placed on the surface of the KOH. The time in seconds was recorded for initial wet out time up to 120 secs. These measurements were taken of the sample "as is" (WET OUT BEFORE) and of the sample after 7 days aging in the 31% KOH (WET OUT AFTER). The same procedure was used for the remaining three discs. The average time in seconds was reported for the four samples.

Electrolyte Retention (Absorbency).

A 6"×6" pyrex dish was filled to an approximate depth of 1" with 31% KOH. A 4"×4" square web sample was weighed and recorded as "dry weight". The sample was completely submerged in the 31% KOH solution and remained submerged for 5 minutes. The sample was removed, allowed to drip for 1 minute, and weighed and recorded as "wet weight". The percent retention was calculated using the following formula:

$$\frac{\text{(Weight weight} - \text{Dry weight)}}{\text{(Dry weight} \times 100)} = \% \text{Retention}$$

The average percent retention for the four samples was reported.

Capillarity Ascension (Wicking measurement).

Measurements were done on four separator samples 25 mm wide and 250 mm long. During the measurement 10 mm of the separator samples were plunged into the electrolyte. The electrolyte rising in the felt versus electrolyte level in the container after 10 minutes was measured.

EXAMPLE I

Wettable Polypropylene Compositions/Films

Twelve samples of the wettable polypropylene compositions of the invention were prepared in accordance with the invention process and comprise the components as indicated in TABLES IIA, IIB, IIC, IID and IIE below. Sample 13 is a control comprised of unmodified polypropylene without any additives.

Samples 1 to 13 were extruded as cast films and tested for wettablility before and after aging in 31% KOH at 70° C. for 7 days. The various hydrophilic polar compounds and other additives in the composition assist in achieving the durability of the exhibited wettability.

In this example only contact angle was tested. All film samples showed wettability. Films with MA-PP, EPDM and PP had a contact angle between 70 to 75° after KOH treatment. Films made with PEG, PVOH and dimer acid, were not KOH activated, and exhibited complete wetting even after aging. These latter films had a contact angle of 50° or lower.

EXAMPLE II

Wettable Polypropylene Compositions/Nonwovens

The same thirteen sample polypropylene compositions from Example I were converted into melt blown webs using conventional processing equipment at a temperature of 510° F., which temperature is much higher than used to make the films. In the melt blown process, hot melt is pumped out of tiny spinneretes and the melt is oriented by air at high velocity, and due to existing temperature gradients alot of surface crystallinity develops on the fibers. Cast films are not subjected to the same process conditions which allows for lower crystallinity, thus permitting the ease of migration of the additives to achieve wettability. The nonwoven samples were tested as 50 gsm.

TABLE I below summarizes the data for all the samples tested before and after aging in 31% KOH for 7 days. Specifically, the wicking; weight loss; initial wet out (up to 120 secs); and absorbency was measured.

TABLE I

WETTABLE POLYPROPYLENE MELTBLOWN NONWOVENS

| SAMPLE NO. | TYPE | WICKING BEFORE | WICKING AFTER | WT. LOSS % | INITIAL WET OUT BEFORE | INITIAL WET OUT AFTER | ABSORB BEFORE | ABSORB AFTER |
|---|---|---|---|---|---|---|---|---|
| 1 | PP/PEG1/MA | 0 | 3.7 | 0.85 | No | No | 241 | 664 |
| 2 | PP/PEG1/MA/E | 0 | 0.8 | 1.5 | No | No | 315 | 444 |
| 3 | PP/PVOH | 0 | 0 | 2 | No | No | 87 | 222 |
| 4 | PP/PVOH/MA | 0 | 0 | 0 | No | No | 195 | 98 |
| 5 | PP/PVOH/MA/E | 0 | 0.5 | 0.9 | No | No | 182 | 52 |
| 6 | PP/PEG2/MA | 0 | 1.3 | 2.8 | No | No | 300 | 120 |
| 7 | PP/PEG2/PVOH | 0 | 0 | 0 | No | No | 134 | 600 |
| 8 | MA/EPD/PP | 0 | 3.3 | 0 | No | No | 28 | 190 |

TABLE I-continued

WETTABLE POLYPROPYLENE MELTBLOWN NONWOVENS

| SAMPLE NO. | TYPE | WICKING BEFORE | WICKING AFTER | WT. LOSS % | INITIAL WET OUT BEFORE | INITIAL WET OUT AFTER | ABSORB BEFORE | ABSORB AFTER |
|---|---|---|---|---|---|---|---|---|
| 9 | PP/DIMER | 0 | 7.3 | 0 | No | 4.7 | 192 | 880 |
| 10 | PP/MONOMER | 0 | 3 | 29.5 | No | 0 | 600 | 538 |
| 11 | PP/PEG1/MA/E | 0 | 7 | 0 | No | 20 | 153 | 1,000 |
| 12 | PP/MA/PVF | 0 | 3 | 0 | No | 0 | 25 | 390 |
| 13 | CONTROL | 0 | 1.2 | 0 | No | No | 144 | 59 |

KEY:
PP - polypropylene commercially available as PP3505 (400 MFR) from Exxon, Houston, Texas;
MA - maleic anhydride modified polypropylene commercially available as MA-PP 597 from Allied Signal, Morristown, New Jersey;
PEG1 - polyethylene glycol commercially available as C-5000 - Carbowax from Union Carbide, Danbury Connecticut;
PEG2 - polyethylene glycol commercially available as F-108 or F-127 from BASF, Mount Olive, New Jersey;
E - ethylene propylene diene monomer commercially available as EPDM 7585 from Uniroyal, Middlebury, Connecticut;
PVOH - polyvinyl alcohol commercially available as VINEX 2019 (3D MI) from Texas Chemicals, Orange, Texas;
Dimer - fatty acid dimer commercially available as Sylvadym ® T-17 from Arizona Chemical, Panama City, Florida;
Monomer - fatty acid monomer commercially available as Actinol ® from Arizona Chemical, Panama City, Florida;
PVF - polyvinyl formal commercially available as INSOFOPM from Intec Polymers Ltd., India As seen from the data in TABLE I, blends 1, 9 and 11 meet the criteria as required for use in battery separators, i.e. wicking of 3 to 8, weight loss of 1–2%, wet out in less than 60 seconds, and absorbency of greater than 200 gm/10 min.

Weight loss of 1 to 2% is acceptable, any more indicates that the polar additive is leaching into the KOH solution which is not acceptable for use as a battery separator. For example, Sample #10 showed a high weight loss, however, this was probably due to the preparation of the sample in that the Actinol® monomer acid was not adequately mixed with the other components to react with the EPDM.

All the nonwoven blends tested exhibited wettability however, there appeared to be little, if any, initial wetting or wicking of the samples. From the test results above, most of the nonwoven samples tested did not wet out before 120 secs (indicated as a NO in Table I). Hence the blends were modified to achieve improved initial wetting by adding 2 to 5% of a surfactant such as V350 and V351 which are commercially available from Polyvel, Inc., New Jersey and are fully described in the Technical Data Sheets which are incorporated herein by reference.

Although samples 2 and 11 were comprised of the same components, they were made on different types of compounders. Sample 2 was made with a fully intermeshing twin screw compounder and Sample 11 on a non-intermeshing twin screw. The better wettability of Sample 11 appears to be due to quicker migration of the polar compounds.

The % of components of Samples 1 to 12 from TABLE I are listed in the tables below.

TABLE IIA

| | % OF COMPONENTS | | | |
|---|---|---|---|---|
| COMPONENT | PP 3505 | EPDM 7565 | MA-PP 597 | MPEG C-5000 |
| TEMP. ° C. | 160 | 150 | 135 | 60 |
| TYPE | Granular | Pellet | Pellet | Powder |
| SAMPLE #1 | 68 | 0 | 20 | 12 |
| SAMPLE #2 | 58 | 10 | 20 | 12 |

TABLE IIB

| | % OF COMPONENTS | | | |
|---|---|---|---|---|
| COMPONENT | PP 3505 | EPDM 7565 | MA-PP 597 | PVOH 2019 |
| TEMP. ° C. | 160 | 150 | 135 | 190 |
| TYPE | Granular | Pellet | Pellet | Pellet |
| Sample #3 | 90 | 0 | 0 | 10 |
| Sample #4 | 70 | 0 | 20 | 10 |
| Sample #5 | 70 | 10 | 10 | 10 |

TABLE IIC

| | % OF COMPONENTS | | | | |
|---|---|---|---|---|---|
| COMPONENT | PP 3505 | MA-PP EPDM 7565 | 597 | PVOH 2019 | PEG F108/F127 |
| TEMP. ° C. | 160 | 150 | 135 | 190 | 60 |
| TYPE | Granular | Pellet | Pellet | Pellet | Powder |
| SAMPLE #6 | 80 | 0 | 10 | 0 | 10 (5%F108 & 5%F127) |
| SAMPLE #7 | 70 | 0 | 20 | 5 | 5(F108) |

TABLE IID

% OF COMPONENTS - TYPE D

| COMPONENT | PP 3505 | EPDM 7565 | MA-PP 597 |
|---|---|---|---|
| TEMP. ° C. | 160 | 150 | 135 |
| TYPE | Granular | Pellet | Pellet |
| SAMPLE #8 | 70 | 10 | 20 |

TABLE III

WETTABLE POLYPROPYLENE MELTBLOWN NONWOVENS

| SAMPLE NO. | TYPE | WICKING BEFORE | WICKING AFTER | WT. LOSS % | INITIAL WET OUT BEFORE | INITIAL WET OUT AFTER | ABSORB BEFORE | ABSORB AFTER |
|---|---|---|---|---|---|---|---|---|
| 9 (50 gsm) | PP/DIMER | 0 | 5.7 | 1.1 | No | 5 | 294 | 1,127 |
| 9 (50 gsm) calendered | PP/DIMER | 0.7 | 8.2 | 3.9 | No | 5 | 243 | 395 |
| 9 (30 gsm) | PP/DIMER | 0 | 4.5 | 4.8 | No | 120 | 233 | 1,142 |
| 9 (30 gsm) calendered | PP/DIMER | 0 | 5.7 | 2.9 | No | 5 | 257 | 297 |
| 10 | PP/MONOMER | 0 | 5.3 | 3.2 | No | 11 | 437 | 428 |
| 1 | PP/PEG1/MA | 0 | 1.0 | 3.5 | No | No | 149 | 1,220 |
| 11 | PP/E/PEG1/MA | 0 | 1.3 | 10.8 | No | No | 76 | 520 |
| 2 | PP/E/PEG1/MA | 0 | 3 | 1.3 | No | No | 82 | 351 |
| 8 | PP/E/MA | 0 | 3.3 | 0 | No | No | 28 | 190 |

TABLE IIE

% OF COMPONENTS

| COMPONENT | PP 3505 | EPDM 7565 | MA-PP 597 | FATTY ACID | Catalyst |
|---|---|---|---|---|---|
| TYPE | Granular | Pellet | Pellet | Liquid | |
| SAMPLE #9 | 85 | 0 | 5 | 10 DIMER | NONE |
| SAMPLE #10 | 84.5 | 10 | 0 | 5 MONOMER | 0.5%* based on wt. of fatty acid present |

*Peroxide catalyst used to promote reaction of monomer with the double bond of the EPDM As mentioned earlier, Sample 11 is the same blend components as Sample 2, except that the former blend was made with a non-intermeshing twin screw and the latter blend was made with a fully intermeshing twin screw.

Sample 12 was a powder comprised of 10% polyvinyl formal, 5% MA-PP and 85% polypropylene (PP-3505-400 MFR).

EXAMPLE III

The blends of Samples 1, 2, 8, 9 and 11 from Example II were tested again or modified as indicated below. The samples were made into nonwovens following the procedure described in Example II. Similar tests were conducted and the results are listed in TABLE III below.

All these samples exhibited wettability.

The examples described above are only illustrative of the methods of the invention, other variations and alternatives in the elements of process of the invention are also contemplated.

The process of the present invention provides advantages over prior practice by including use of a maleic anhydride modified polypropylene having a very high melt flow rate to allow it to migrate to the surface. Alternatively, dimer acids, PEG or PVOH are incorporated in the invention blends with or without the presence of the maleic anhydride modified polypropylene. The amorphous component, such as ethylene propylene diene rubber, is used to push the polar compounds to the surface where a non-polar interface exists unlike the prior art where the contact interface was polar. Additional wettability is achieved with incorporation of the surfactant that has more resistance to KOH solution than surfactants used in the prior art. Increased wettability is achieved even without the surfactant by activating the groups in the maleic anhydride modified polypropylene by hot KOH solution. The wettability claimed in the invention is permanent and durable in a KOH solution as opposed to the prior art. The invention blends can be extruded into films, fibers, nonwovens and coatings.

Finally, variations from the examples given herein are possible in view of the above disclosure. Therefore, although the invention has been described with reference to certain preferred embodiments, it will be appreciated that other processes may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. A wettable polypropylene composition comprising:
    polypropylene; and
    a hydrophilic, polar compound which includes functional sites selected from the group consisting of carboxyl, hydroxy, ether or ester moieties;
    wherein the polypropylene composition is wettable, having a contact angle less than or equal to 75° and has a melt flow rate greater than 12 dg/min.

2. The wettable polypropylene composition according to claim 1, wherein the polypropylene composition remains wettable in a 31% KOH solution at 70° C. for at least 7 days.

3. The wettable polypropylene composition according to claim 1, comprising up to 85 weight % of said polypropylene.

4. The wettable polypropylene composition according to claim 1, comprising up to 35 weight % of said hydrophilic, polar compound.

5. The wettable polypropylene composition according to claim 1, wherein the polypropylene composition is formed into a nonwoven having a wicking of at least 3 cm.

6. The wettable polypropylene composition according to claim 1, wherein said hydrophilic, polar compounds have a lower viscosity than said polypropylene.

7. The wettable polypropylene composition according to claim 1, wherein said hydrophilic polar compounds are materials which migrate to the surface of said polypropylene and solidify on said surface.

8. The wettable polypropylene composition according to claim 1, wherein said hydrophilic polar compounds are selected from the group consisting of maleic anhydride-modified polypropylene (MAPP), acrylic acid modified polypropylene, ethylene acrylate modified polypropylene, polypropylene grafted with a sodium salt of an acrylic acid, polyethylene glycol (PEG), modified polyethylene glycol, polyvinyl alcohol (PVOH) and polyvinyl formal (PVF).

9. The wettable polypropylene composition according to claim 7, wherein said hydrophilic polar compounds are selected from the group consisting of monomer and dimer fatty acids having a carbon chain length in the range of 6 to 50.

10. The wettable polypropylene composition according to claim 1, further comprising an amorphous compound which enhances the migration of said hydrophilic compound to the surface of the polypropylene.

11. The wettable polypropylene composition according to claim 10, wherein said amorphous compounds are selected from the group consisting of ethylene propylene diene monomer ("EPDM"), amorphous PP, polybutylene blends, and other low crystallinity polymers.

12. The wettable polypropylene composition according to claim 1, further comprising a surfactant.

13. The wettable polypropylene composition according to claim 1, for use in battery separators, absorbent and hygiene products, films and extrusion coated paper and paperboard.

14. A method of making polypropylene wettable comprising:
    mixing polypropylene and a hydrophilic, polar compound which includes functional sites selected from the group consisting of carboxyl, hydroxy, ether or ester moieties to form a mixture;
    heating said mixture to temperatures in the range of 200 to 220° C. to melt said polypropylene;
    allowing the mixture to cool wherein said polypropylene solidifies and said hydrophilic polar compound migrates to the surface of the polypropylene such that the polypropylene formed is wettable, having a contact angle less than or equal to 75°.

15. The method according to claim 14, wherein said mixture comprises up to 85 weight % of said polypropylene.

16. The method according to claim 14, wherein said mixture comprises up to 35 weight % of said hydrophilic polar compound.

17. The method according to claim 14, wherein said hydrophilic, polar compounds have a lower viscosity than said polypropylene.

18. The method according to claim 14, wherein said hydrophilic, polar compounds are materials which migrate to the surface of the polypropylene and solidify on said surface.

19. The method according to claim 14, wherein said hydrophilic polar compounds are selected from the group consisting of maleic anhydride modified polypropylene (MA-PP), acrylic acid modified polypropylene, ethylene acrylate modified polypropylene, polypropylene grafted with a sodium salt of an acrylic acid, polyethylene glycol (PEG), modified polyethylene glycol and polyvinyl alcohol (PVOH) and polyvinyl formal (PVF).

20. The method according to claim 14, wherein said hydrophilic polar compounds are selected from the group consisting of monomer and dimer fatty acids having a carbon chain length in the range of 6 to 50.

21. The method according to claim 14, further comprising adding an amorphous compound said mixture to enhances the migration of said hydrophilic compound to the surface of the polypropylene.

22. The method according to claim 21, wherein said amorphous compound are selected from the group consisting of EPDM ("ethylene propylene diene monomer"), amorphous PP, polybutylene blends, and other low crystallinity polymers.

23. The method according to claim 14, further comprising adding a surfactant to said mixture.

24. The method according to claim 14, wherein the polypropylene is formed into a fiber, film, coating or nonwoven.

25. The method according to claim 14, wherein the polypropylene is formed into a nonwoven having a wicking of at least 3 cm.

26. A polypropylene having wettablity and absorbency comprising:
    up to 85 weight % polypropylene; and
    up to 35 weight % of a hydrophilic, polar compound which includes functional sites selected from the group consisting of carboxyl, hydroxy, ether or ester moieties;
    wherein the polypropylene is wettable, having a contact angle less than or equal to 75° and has a melt flow rate greater than 12 dg/min.

27. The polypropylene according to claim 26, wherein said hydrophilic polar compounds are selected from the group consisting of maleic anhydride-modified polypropylene (MA-PP), acrylic acid modified polypropylene, ethylene acrylate modified polypropylene, polypropylene grafted with a sodium salt of an acrylic acid, polyethylene glycol (PEG), modified polyethylene glycol, polyvinyl alcohol (PVOH), polyvinyl formal (PVF); and monomer and dimer fatty acids having a carbon chain length in the range of 18 to 36.

28. The polypropylene according to claim 26, wherein said hydrophilic polar compound is a mixture of two materials, the first material selected from the group consisting of maleic anhydride-modified polypropylene (MAPP), acrylic acid modified polypropylene, ethylene acrylate modified polypropylene, polypropylene grafted with a sodium salt of an acrylic acid, polyethylene glycol (PEG), modified polyethylene glycol, polyvinyl alcohol (PVOH), polyvinyl formal (PVF); and the second material selected from the group consisting of monomer and dimer fatty acids having a carbon chain length in the range of 6 to 50.

29. The polypropylene according to claim 26, further comprising an amorphous compound which enhances the migration of said hydrophilic compound to the surface of the polypropylene.

30. The polypropylene according to claim 26, further comprising a surfactant.

31. The polypropylene according to claim 26, wherein the polypropylene is formed into a nonwoven having wicking of at least 3 cm.

32. The polypropylene according to claim 26, comprising said polypropylene and wherein said hydrophilic compound is maleic anhydride-modified polypropylene (MAPP).

33. The polypropylene according to claim 32, further comprising a surfactant.

34. The polypropylene according to claim 32, further comprising an amorphous compound which enhances the migration of said hydrophilic compound to the surface of the polypropylene.

35. The polypropylene according to claim 32, further comprising at least one additional compound selected from the group consisting of polyethylene glycol (PEG), modified polyethylene glycol, polyvinyl alcohol (PVOH), and polyvinyl formal (PVF).

36. The polypropylene according to claim 32, further comprising dimer fatty acids having a carbon chain length in the range of 6 to 50.

37. The polypropylene according to claim 26, comprising said polypropylene and wherein said hydrophilic compound is a dimer fatty acid having a carbon chain length in the range of 6 to 50.

38. The polypropylene according to claim 36, further comprising an amorphous compound which enhances the migration of said hydrophilic compound to the surface of the polypropylene.

39. The polypropylene according to claim 26 for use in battery separators, absorbent and hygiene products.

40. A wettable polypropylene composition consisting essentially of:

polypropylene; and a hydrophilic, polar compound which includes functional sites selected from the group consisting of carboxyl, hydroxy, ether or ester moieties;

wherein the polypropylene composition is wettable, having a contact angle less than or equal to 75°.

41. A polypropylene having wettablity and absorbency consisting essentially of:

up to 85 weight % polypropylene; and up to 35 weight % of a hydrophilic, polar compound which includes functional sites selected from the group consisting of carboxyl, hydroxy, ether or ester moieties;

wherein the polypropylene is wettable, having a contact angle less than or equal to 75°.

* * * * *

UNITED STATES PATENT AND TRADEMARK OFFICE
CERTIFICATE OF CORRECTION

PATENT NO : 6,153,701
DATED : November 28, 2000
INVENTOR(S) : Potnis et al.

It is certified that error appears in the above-identified patent and that said Letters Patent are hereby corrected as shown below:

On the cover page at:

[56] Under U.S. Patent Documents insert after Gaylord -- . . . . . . . 260/42 --.

Under Attorney, Agent, or Firm change "Onofrid, Esq. to -- Onofrio, Esq. --.

Col. 2 line 13 after "polypropylene films" insert – which --.

Col. 3 line 30 after "polypropylene" delete "an" and insert --and --.

Col. 4 line 10 after "methods" insert -- such as plasma --.

Col. 4 line 59 after "80°C" delete -- . --.

Col. 5 line 36 after "include" insert -- a --.

Col. 5 line 50 delete "EPSM" and insert -- EPDM --.

Col. 11 line 20 after VINEX 2019 delete "3D MI" and insert --30 MI --.

Claim 21, Col. 16 line 32 after "compound" insert -- to --.

UNITED STATES PATENT AND TRADEMARK OFFICE
CERTIFICATE OF CORRECTION

PATENT NO. : 6,153,701
DATED : November 28, 2000
INVENTOR(S) : Potnis et al.

It is certified that error appears in the above-identified patent and that said Letters Patent is hereby corrected as shown below:

Claim 22, Col. 16 line 36 change "compound" to -- compounds --.

Signed and Sealed this

First Day of May, 2001

Attest:

NICHOLAS P. GODICI

*Attesting Officer*   *Acting Director of the United States Patent and Trademark Office*